US008640180B2

(12) United States Patent
Carroll et al.

(10) Patent No.: US 8,640,180 B2
(45) Date of Patent: Jan. 28, 2014

(54) APPARATUS AND METHOD FOR CLIENT-SIDE COMPOSITING OF VIDEO STREAMS (75) Inventors: Martin D. Carroll, Watchung, NJ (US); Paul A. Wilford, Bernardsville, NJ (US)

(73) Assignee: Alcatel Lucent, Paris (FR)

(*) Notice: Subject to any disclaimer, the term of this patent is extended or adjusted under 35 U.S.C. 154(b) by 318 days.

(21) Appl. No.: 12/923,592

(22) Filed: Sep. 29, 2010

(65) Prior Publication Data
US 2012/0075531 A1 Mar. 29, 2012

(51) Int. Cl.
H04N 7/173 (2011.01)

(52) U.S. Cl.
USPC ............ 725/118; 348/584; 348/569; 725/38; 725/39; 725/32; 725/135; 709/231

(58) Field of Classification Search
USPC .......... 725/38, 39, 32, 135; 348/569; 709/231
See application file for complete search history.

(56) References Cited

U.S. PATENT DOCUMENTS

| 6,069,669 | A | 5/2000 | Park et al. |
| 2005/0108778 | A1 | 5/2005 | Stone et al. |
| 2012/0063743 | A1* | 3/2012 | Bratton et al. ............... 386/248 |

OTHER PUBLICATIONS

International Search Report and Written Opinion dated Jul. 5, 2012.

* cited by examiner

Primary Examiner — Jefferey Harold
Assistant Examiner — Sihar Karwan
(74) Attorney, Agent, or Firm — Harness, Dickey & Pierce (57) ABSTRACT The present invention relates to an apparatus and method for client-side compositing of video streams. The method includes receiving, by the video display device, a multiplexed data stream from a remote video server. The multiplexed data stream includes substreams, where the substreams includes a descriptor substream, at least one media substream, and a compositing-instruction substream. The method further includes demultiplexing, by the video display device, the multiplexed data stream into the substreams according to the descriptor substream and displaying, by the video display device, the at least one media substream on a display screen according to the compositing-instruction substream, where the compositing-instruction substream includes instructions on a composition of the at least one media substream.

26 Claims, 7 Drawing Sheets

APPARATUS AND METHOD FOR CLIENT-SIDE COMPOSITING OF VIDEO STREAMS

BACKGROUND

Many video distribution systems perform all video compositing at the server. However, such server-side compositing often results in a final composited video that is not well tailored to the client's device or the client's personal preferences.

For example, when a broadcast network broadcasts a baseball game, the client device often displays one or two information boxes containing the current status of the game (current score, current ball and strike count, etc.). These on-screen displays (OSDs) are intended to be displayed in the far upper-left and far upper-right corners of the display screen. When watching the baseball game on a traditional square television set, the OSDs are displayed in this location. However, when watching the baseball game on a newer wide-screen television set, the OSDs may not be located in the far upper-left and far upper-right corners of the display screen. Rather, the OSDs may be displayed closer towards the center of the display screen. This behavior occurs because the video image is intentionally composited at the video server such that the OSDs are visible on all types of display screens. Because wide-screen television sets have more horizontal display area than traditional square television sets, the OSDs appear to be closer to the center of the wide-screen display. Hence, it can be appreciated that often the best way to display a video stream is a function of the type of display screen of the client device. In another example, a user may wish to not view the OSDs sent by the broadcaster. Unfortunately, conventional composite-at-the-server methods do not allow a user to control whether an OSD is displayed. In yet another example, a user may want to switch formats of a movie depending on what type of client device he/she is using. For example, if a movie is filmed in wide-screen format and the user has a traditional square television set, the user may want the ability to choose whether to display the movie in letter-box format or square format. Unfortunately, changing the composition of the display images according to the preference of a user is limited in conventional systems.

SUMMARY

The present invention relates to an apparatus and method for client-side compositing of video streams.

The method includes receiving, by the video display device, a multiplexed data stream from a remote video server. The multiplexed data stream includes substreams, where the substreams includes a descriptor substream, at least one media substream, and a compositing-instruction substream. The method further includes demultiplexing, by the video display device, the multiplexed data stream into the substreams according to the descriptor substream and displaying, by the video display device, the at least one media substream on a display screen according to the compositing-instruction substream, where the compositing-instruction substream includes instructions on a composition of the at least one media substream.

The displaying step may display the at least one media substream as an on-screen display or a picture-in-picture in an area of the display screen indicated by the compositing-instruction substream.

The method may further include receiving, by the video display device, a first instruction command from a user. The first instruction command changes a composition of the at least one media substream to a composition different from the composition indicated by the compositing-instruction substream, where the displaying step displays the at least one media substream according to the changed composition. Also, the first instruction command may indicate a removal of a media substream included in the multiplexed data stream. Also, the first instruction command may indicate a change of at least one of a display size, display color, display shape, or display location of the at least one media substream. Furthermore, the first instruction command may indicate an addition of a media substream to the multiplexed data stream.

In another embodiment, the multiplexed data stream may include a plurality of media substreams. Each of the plurality of media substreams includes the same video data according to different display aspect ratios. The display step displays at least one of the plurality of media substreams that has a display aspect ratio that is closest to the video display device based on the compositing-instruction substream.

Embodiments of the present invention also include a method for client-side compositing of media streams by a video server. The method includes generating, by the video server, a compositing-instruction substream. The compositing-instruction substream includes instructions on a composition of at least one media substream. The method further includes multiplexing, by the video server, a descriptor substream, the at least one media substream, and the compositing-instruction substream and transmitting, by the video server, the multiplexed data stream to be displayed on a display screen according to the compositing-instruction substream.

The compositing-instruction substream may indicate an area of the display screen to display the at least one media substream as an on-screen display or picture-in-picture.

The method may further include receiving, by the video server, a first instruction command from the video display device. The first instruction command changes a composition of the at least one media substream to a composition different from the composition indicated by the compositing-instruction substream, where the generating step generates an updated compositing-instruction substream indicating the changed composition. The first instruction command may indicate a removal of a media substream included in the transmitted multiplexed data stream. Also, the first instruction command may indicate a change of at least one of a display size, display color, display shape, or display location of the at least one media substream included in the multiplexed data stream. Also, the first instruction command may indicate an addition of a media substream to the multiplexed data stream.

In another embodiment, the multiplexed data stream includes a plurality of media substreams. Each of the plurality of media substreams includes the same video data according to different display aspect ratios. The compositing-instruction substream may include instructions for a video display device to select one of the plurality of media substreams that has a display aspect ratio that is closest to the display device.

Embodiments of the present invention also include a video display device for client-side compositing of media streams. The video display device includes a demultiplexer configured to demultiplex a multiplexed data stream into substreams. The substreams includes a descriptor sub-stream, at least one media substream, and a compositing-instruction substream. The compositing-instruction substream includes instructions on a composition of the at least one media substream. The video display device also includes a controller configured to display the at least one media substream on a display screen according to the compositing-instruction substream. The controller may display the at least one media substream as an on-screen display or a picture-in-picture in an area of the display screen indicated by the compositing-instruction substream.

Also, the video display device may be configured to receive a first instruction command from a user. The first instruction command changes a composition of the at least one media substream to a composition different from the composition indicated by the compositing-instruction substream, where the controller displays the at least one media substream according to the changed composition. The first instruction command may indicate a removal of a media substream included in the multiplexed data stream. The first instruction command may indicate a change of at least one of a display size, display color, display shape, or display location of the at least one media substream. Also, the first instruction command may indicate an addition of a media substream to the multiplexed data stream.

According to another embodiment, the multiplexed data stream includes a plurality of media substreams. Each of the plurality of media substreams includes the same video data according to different display aspect ratios, and the controller displays at least one of the plurality of media substreams that has a display aspect ratio that is closest to the video display device based on the compositing-instruction substream.

Embodiments of the present invention also include a video server for client-side compositing of media streams. The video server includes a controller configured to generate a compositing-instruction substream. The compositing-instruction substream includes instructions on a composition of at least one media substream. The video server also includes a multiplexer configured to multiplex a descriptor substream, the at least one media substream, and the compositing-instruction substream, and configured to transmit the multiplexed data stream to be displayed on a display screen according to the compositing-instruction substream.

The compositing-instruction substream may indicate an area of the display screen to display the at least one media substream as an on-screen object or picture-in-picture.

Also, the video server is configured to receive a first instruction command from the video display device. The first instruction command changes a composition of the at least one media substream to a composition different from the composition indicated by the compositing-instruction substream, and the controller generates an updated compositing-instruction substream indicating the changed composition. The first instruction command may indicate a removal of a media substream included in the transmitted multiplexed data stream. Also, the first instruction command may indicate a change of at least one of a display size, display color, display shape, and display location of the at least one media substream included in the multiplexed data stream. Furthermore, the first instruction command may indicate an addition of a media substream to the multiplexed data stream.

In another embodiment, the multiplexed data stream includes a plurality of media substreams. Each of the plurality of media substreams includes the same video data according to different display aspect ratios. The compositing-instruction substream includes instructions for a video display device to select one of the plurality of media substreams that has a display aspect ratio that is closest to the display device.

BRIEF DESCRIPTION OF THE DRAWINGS

Example embodiments will become more fully understood from the detailed description given herein below and the accompanying drawings, wherein like elements are represented by like reference numerals, which are given by way of illustration only and thus are not limiting of the present invention, and wherein.

DETAILED DESCRIPTION OF EXAMPLE EMBODIMENTS

Various embodiments of the present invention will now be described more fully with reference to the accompanying drawings. Like elements on the drawings are labeled by like reference numerals.

As used herein, the singular forms "a", "an", and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

The present invention will now be described with reference to the attached figures. Various structures, systems and devices are schematically depicted in the drawings for purposes of explanation only and so as not to obscure the present invention with details that are well known to those skilled in the art. Nevertheless, the attached drawings are included to describe and explain illustrative examples of the present invention. The words and phrases used herein should be understood and interpreted to have a meaning consistent with the understanding of those words and phrases by those skilled in the relevant art. To the extent that a term or phrase is intended to have a special meaning, i.e., a meaning other than that understood by skilled artisans, such a special definition will be expressly set forth in the specification that directly and unequivocally provides the special definition for the term or phrase.

Example embodiments provide a method and apparatus that allows the user to have more control over the displaying of video images on a display screen. For example, embodiments of the present invention composite at least one of the media data streams on a video display device as opposed to the video server. For instance, as explained below, embodiments of the present invention make it possible to perform some or all the compositing operations at the video display device (client-side), thereby enabling the client's device and preferences to be better taken into account during the compositing operation, and thus resulting in a final composited video that is tailored to the client's device and preferences.

Figure 1:
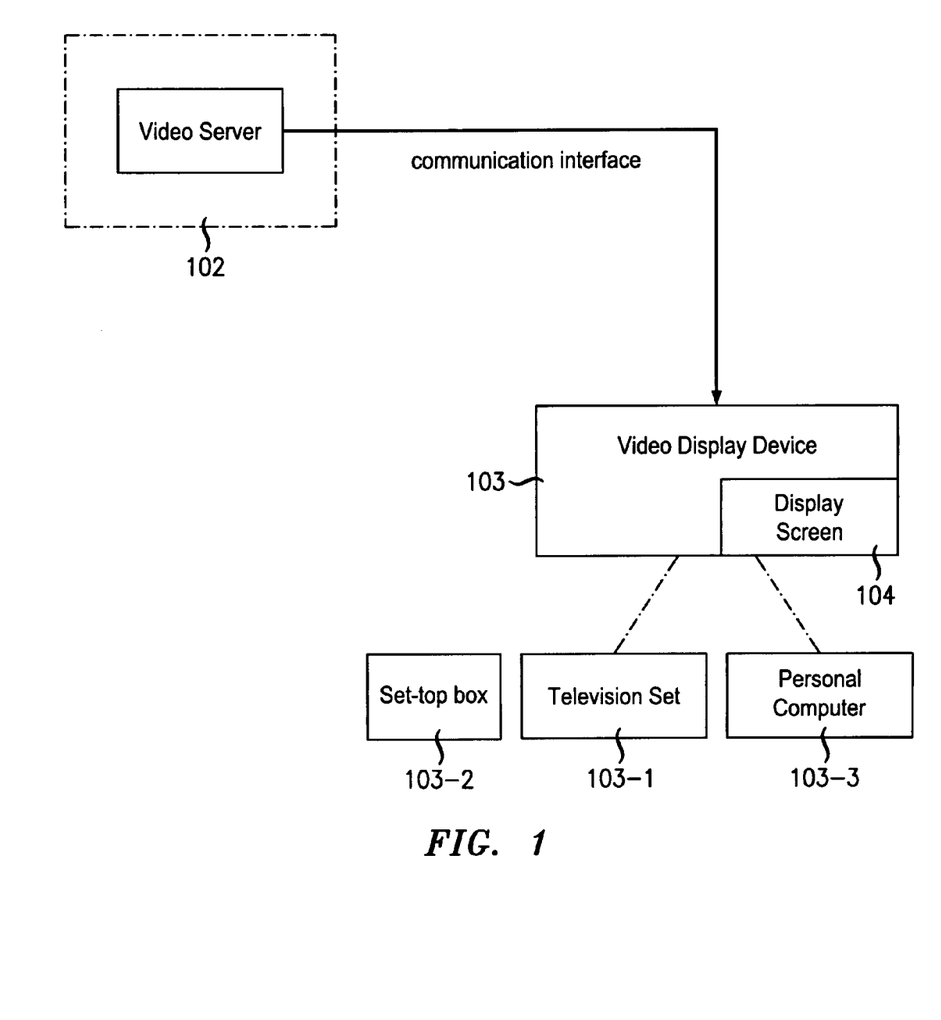
FIG. 1 illustrates various components of a system for transmitting data streams to video display devices according to an embodiment of the present invention.

FIG. 1 illustrates various components of a system for transmitting data streams to video display devices according to an embodiment of the present invention. For instance, FIG. 1 illustrates at least one video server 102 that transmits multiplexed data streams via a communication interface to at least one video display device 103 to be displayed on a display screen 104 of the video display device 103. The display screen 104 may be included in the video display device 103 or a separate device that is connected to the video display device 103 via a wired and/or wireless connection. The multiplexed data streams may represent at least one media stream. A media stream may be any type of media stream including but not limited to audio/visual (A/V) streams, and text/graphic streams for On-Screen Displays (OSD). The media streams cover any number and type of codecs such as MPEG or HTML (e.g., the invention is codec-neutral). The details of the multiplexed data streams are further explained below.

The video display device 103 may include any type of system capable of processing and displaying the transmitted data streams. For example, the video display device 103 may include a television 103-1 or a personal computer 103-3, or any combination thereof, for example. The television 103-1 may be any type of conventional television set. Also, the television 103-1 may be used in conjunction with any type of set-top box 103-2 such as a cable box, a satellite receiver, or game console, for example. The personal computer 103-3 may be any type of personal computer that has a processor, memory, and a display screen for displaying the transmitted multiplexed data streams. The video server 102 is a computer based device (also called a 'host') dedicated to delivering video data.

The video server 102 transmits the multiplexed data streams to the at least one video display device 103 through any type of communication interface such as wireless/wired internet connections, radio transmissions (e.g., broadcast or satellite), or cable connections, for example.

According to embodiments of the present invention, instead of compositing all the data streams at the video server 102, the video display device 103 composites and displays at least one of the media streams according to a compositing-instruction substream, which is generated at the video server 102. For example, at any given moment, the multiplexed data stream that is transmitted from the video server 102 to the video display device 103 includes one multiplex-descriptor substream (descriptor substream), zero or more media substreams, and zero or one compositing-instruction substream. The descriptor substream is always present in the multiplexed data stream. However, at any given moment, the data stream may additionally include one or more media substreams and/or the compositing-instruction substream. The compositing-instruction substream includes instructions on the composition of the one or more media substreams. In other words, the compositing-instruction substream includes a set of instructions on how to composite one or more of the media substreams. Generally, the multiplexed data stream includes the compositing-instruction substream when the video server 102 needs to change the compositing instructions, as further described below.

The descriptor substream describes the current contents of the multiplexed data stream, such as the number of each type of substream currently present in the multiplexed data stream, and in the case of media streams, the encoding used for each such substream. The supported media encodings are, at a minimum, MPEG and HTML. However, embodiments of the present invention emcompass any type of encoding/decoding.

Figure 2:
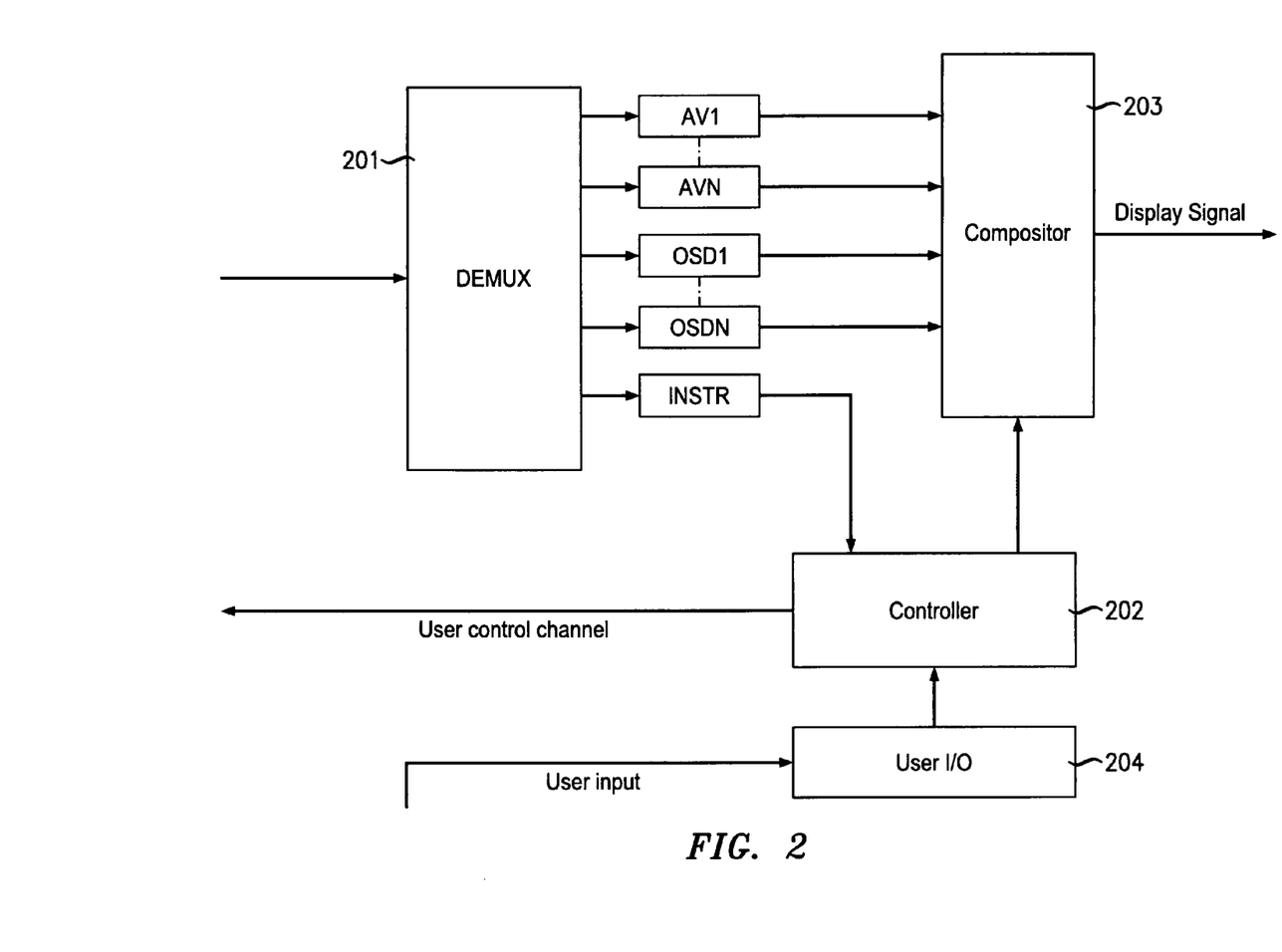
FIG. 2 illustrates a video display device according to embodiments of the present invention.

FIG. 2 illustrates a video display device 103 according to embodiments of the present invention. For example, the video display device 103 includes a demultiplexer 201, a compositor 203, a controller 202, a user interface 204, and the display screen 104, which is not shown in FIG. 2. The video display device 103 also includes other components that are well known to one of ordinary skill in the art such as a tuner and/or antenna for receiving the transmitted multiplexed data streams, a decoder for decoding video data, and a memory/buffer for storing frames of the decoded video data, for example. The components of the video display device 103 may be implemented in the television 103-1, the set-top box 103-2, and/or the personal computer 103-3 in a manner within the skill of someone with ordinary skill in the art.

Referring to FIG. 2, the video display device 103 receives the multiplexed data stream via a tuner or receiver antenna (not shown). As indicated above, at any given point, the multiplexed data stream includes one descriptor substream, zero or more media streams, and zero or one compositing-instruction substream. The demultiplexer 201 demultiplexes the multiplexed data stream into the substreams according to the descriptor substream. The descriptor substream includes, for example, information on the number and type of substream that are included in the multiplexed data stream. The descriptor substream also includes the necessary codec information to enable the receiver to properly decode the media streams included in the multiplexed data stream. First, the demultiplexer 201 pulls out the multiplex descriptor, which the demultiplexer 201 knows is present in the multiplexed data stream. The demultiplexer 201 then reads the descriptor to find out the other contents contained in the multiplexed data stream. The demultiplexer 201 uses this information to demultiplex the rest of the multiplexed data stream. For example, the demultiplexer 201 demultiplexes media substreams ($AV_1$ to $AV_N$, $ODS_1$ to $OSD_N$) based on the descriptor substream. Although the figure illustrates the media streams as A/V streams and text/graphic streams for OSDs, embodiments of the present invention cover any type of media stream. For instance, each media stream has an encoding, and each is composited according to the compositing instructions. The A/V and OSD categories are for explanatory purposes only. Also, the demultiplexer 201 demultiplexes the compositing-instruction substream INSTR from the multiplexed data stream, if this substream is present in the multiplexed data stream. Referring to FIG. 2, the substreams include any number media substreams (including zero). Although not shown, the video display device 103 decodes the selected media substreams to generate frames that may be stored in a buffer memory in the video display device 103.

Next, the controller 203 displays the demultiplexed media substreams on the display screen 104 of the video display device 103 according to the compositing-instruction substream, which may be modified as explained later in the specification. For instance, the media substreams present in the multiplexed data signal are received at the compositor 203 after they are demultiplexed. The controller 202 controls the compositor 203 to composite the media substreams according to the compositing-instruction substream. The compositing-instruction includes a set of composite instructions for the composition of the media substreams. The composition may relate to the display size, display color, display shape, and display location of the media substreams, for example. However, the composite instructions may include any type of composition instructions relating to the display of the media substreams. For example, composition instruction may be predefined codes or syntaxes that include at least one byte in the multiplexed data stream. For example, the defined code (e.g., 1, 01, 101, etc.) may be recognized by the video display device 103 or the video server 102 as pertaining to a specific kind of instruction. Examples of specific kinds of instructions are discussed later in the specification.

After the media substreams are composited in the compositor 203 according to the composition instructions, a graphics-display subsystem (not-shown) displays the composited display signal on the display screen 104 of the video display device 103.

In addition, the video display device 103 includes a user interface 204 configured to receive user input from an input device such as a computer mouse or a remote controller, for example. In addition, a user may provide input directly to the video display device 103 by pressing control buttons on the video display device 103 itself. The video display device 103 may display a menu that allows a user to change the composition of the media substreams to a composition different from the composition indicated by the compositing-instruction substream.

Based on the user signal from the user, the video server 102 or the video display device 103 may perform the composite alteration. This feature is explained later in the specification.

Figure 3:
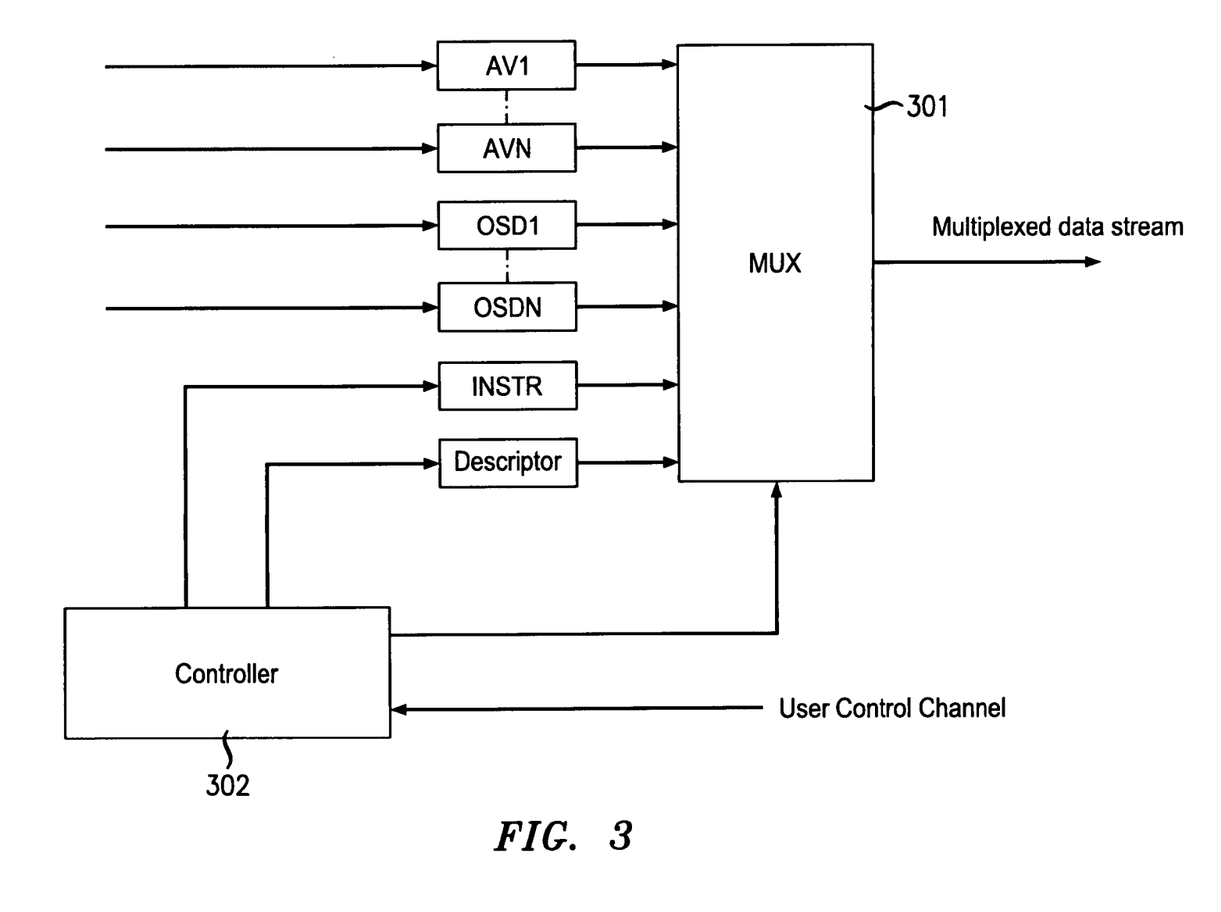
FIG. 3 illustrates a video server according to embodiments of the present invention.

FIG. 3 illustrates a video server 102 according to embodiments of the present invention. The video server 102 includes a controller 302 and a multiplexer 301. The video server 102 also includes other components that are well known in video servers. The controller 302 controls which substreams are selected by the multiplexer 301 to be combined into the multiplexed data signal. For example, the controller 302 instructs the multiplexer 301 to multiplex any number of media substreams into the multiplexed data stream. Further, the video server 102 may include an encoder (not shown) to encode the media substreams using any known encoding techniques.

The controller 302 generates the compositing-instruction substream INSTR and the descriptor substream to be multiplexed with the media substreams. For instance, the controller 302 generates the compositing-instruction substream INSTR based on the input of the designer of the data stream. As indicated earlier, the compositing-instruction substream includes instructions on how the media substreams are to be composited by the video display device 103. The controller 302 generates the descriptor substream based on the number of each type of media substream to be included in the multiplexed data stream and the type of encoding to be applied. The video server 102 transmits the multiplexed data stream to the video display device 103 via the communication interface.

In addition, the video server 102 may include multiple media streams in the multiplexed data stream, where each substream may or may not correspond to the same video content. In one embodiment of the present invention, each media substream may correspond to the same primary view of a television program, but relate to different display aspect ratios for different sizes of display screens. Because different display screens have different aspect ratios, each video display device 103 must crop or stretch the media substream to the size of the display screen. However, to prevent undesirable cropping and stretching, the video server 102 may include a plurality of media substreams, where the plurality of media substreams include the same video data according to different display aspect ratios, and the video display device 103 displays the media substream that has a display aspect ratio that is closest to the display screen 104 of the video display device 103 based on the composition-instruction substream. For example, the controller 302 generates the compositing-instruction substream to include a set of instructions instructing the video display device 103 to select the media substream that has the closest display aspect ratio of the display screen 104 of the video display device 103.

Figure 4:
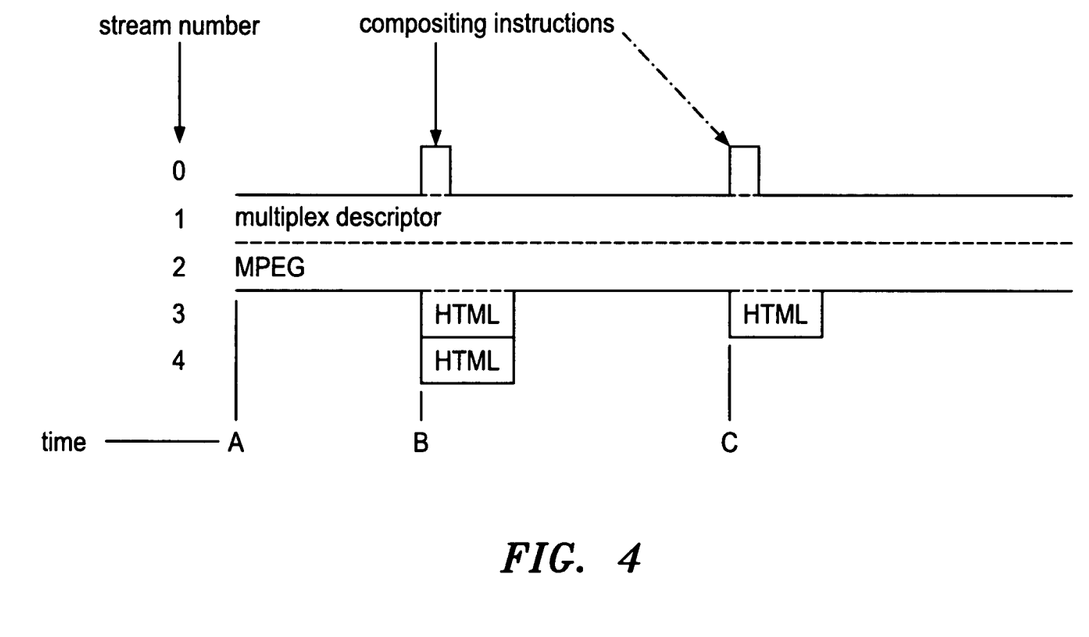
FIG. 4 illustrates a multiplexed data stream according to embodiments of the present invention.

FIG. 4 illustrates a multiplexed data stream according to embodiments of the present invention. At time A, the multiplexed data stream includes an MPEG media substream 2 and the descriptor substream 1, which is always present, per requirement. Suppose the MPEG media substream 2 corresponds to the audio and video content of a baseball game. At time B, the on-screen displays containing the current status of the game (current score, current ball and strike count, etc.) are first displayed (e.g., text/graphics substream 3 and text/graphics substream 4). At time B, the multiplex data stream includes the composition-instructing substream 0, the multiplex descriptor 1, the MEPG media substream 2, and HTML substream 3 and HTML substream 4.

The compositing-instruction substream 0 may include instructions on how to display the HTML substream 3 and the HTML substream 4 as on-screen displays in a display area of the display screen 104. For example, the compositing-instruction substream may include instructions specifying the following: "composite HTML substream 3 in the upper-left corner, composite HTML substream 4 in the upper-right corner, and keep compositing it there until further notice." The above-identified composition instruction and any other composition instruction encompassed by the described embodiments may be represented by at least one predefined code that includes at least one byte.

At time C, suppose the on-screen displays corresponding to the HTML text/graphic substream 3 and second HTML text/graphic substream 4 need to be updated due to a change in the score of the game. At this time, the multiplexed data stream includes the composite-instructing substream 0, the multiplex descriptor 1, the MPEG media substream 2, and an HTML media substream 3 including the updated information. The compositing-instruction substream at time C may include the following compositing instructions: "remove the previous HTML media substream 4 from the composite, composite the new substream 3 in the upper-right corner, and keep compositing it there until further notice."

Figure 5:
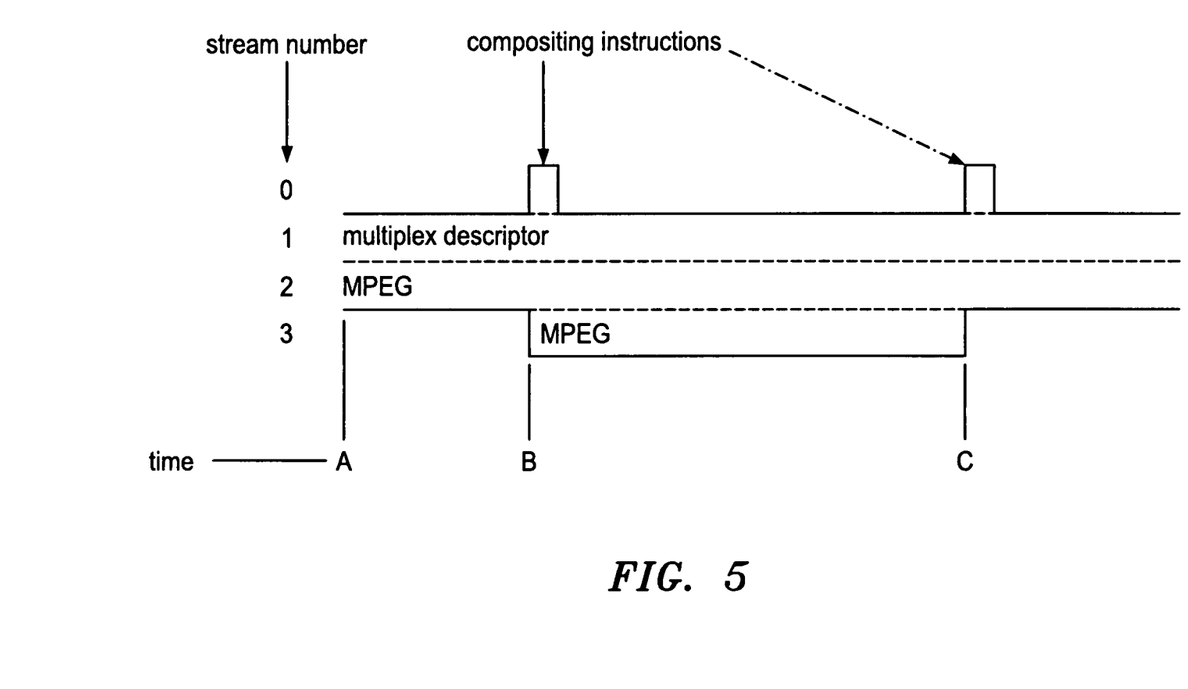
FIG. 5 illustrates a multiplexed data stream having more than one media substream according to embodiments of the present invention.

FIG. 5 illustrates a multiplexed data stream having more than one media substream according to embodiments of the present invention. For instance, image data associated with one MPEG substream may want to be displayed as a picture-in-picture of another MPEG substream. In order to accomplish this, at time B, the video server 102 transmits the following the multiplexed data stream: the compositing-instruction substream 0, the descriptor substream 1, the MPEG media substream 2, and another MPEG media substream 3. The compositing-instruction substream includes instructions on how to composite the MPEG media substream 3 with the MPEG media substream 2. For example, the compositing-instruction substream may include the following compositing instructions: "composite stream 3 in the lower-right corner." The compositing-instruction substream at time C may be to stop compositing MPEG substream 3.

As indicated earlier, the video display device 103 may display a menu that allows a user to change the composition of the media substreams to a composition different from the composition indicated by the compositing-instruction substream. For example, the user provides his selection via the input device or on the video display device 103 itself, which is received by the user interface 204. This user command is forward to the controller 202.

Based on the user command from the user, the video server 102 or the video display device 103 may perform the composite alteration. If the video server 102 performs the alteration, it may be referred to as server-mediated viewer alteration. If the video display device 103 performs the alteration, it may be referred to as client-mediated viewer alteration.

Referring to FIG. 2, in client-mediated viewer alteration, the controller 202 controls the compositor 203 to composite the media substreams according to the user's preference. For example, if the user has indicated not to display a particular media substream, the compositor 203 does not composite that media substream into the final display signal. In addition, the controller 202 may control the compositor 203 to composite the media streams in different display locations, display shapes, display sizes, display colors, etc. based on the user's instruction command.

Figure 6:
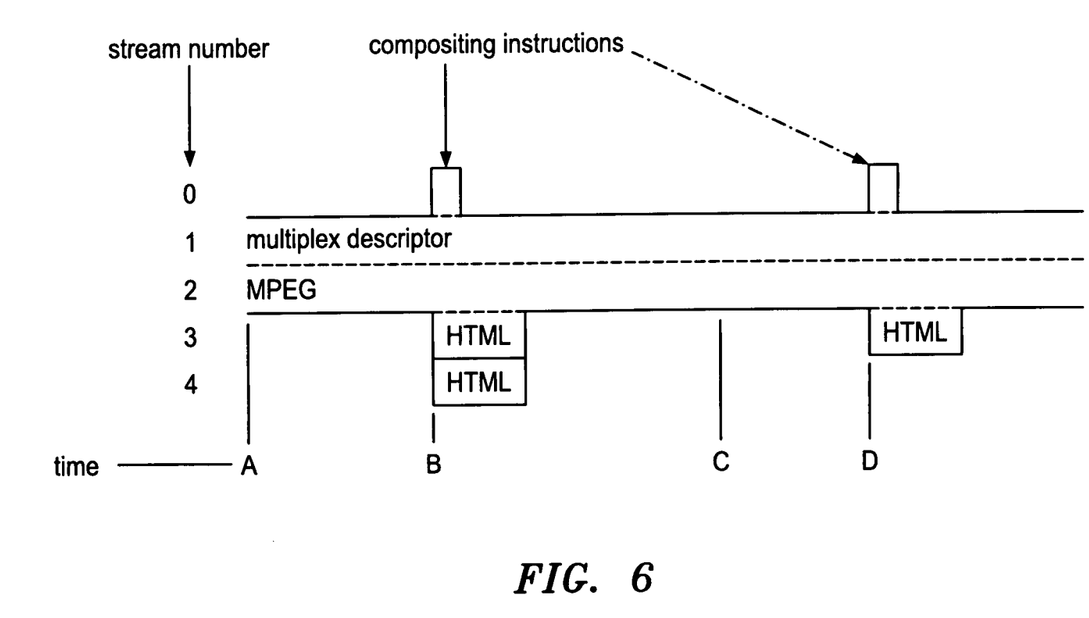
FIG. 6 illustrates an example of a client-mediated alteration of the data stream according to embodiments of the present invention.

FIG. 6 illustrates an example of the client-mediated alteration of the data stream according to embodiments of the present invention. Referring to FIG. 6, at time A, the multiplexed data stream includes the descriptor substream 1 and one MPEG media substream 2. At time B, the multiplexed data stream includes the descriptor substream 1, the MPEG media substream 2, a compositing-instruction substream 0 and two HTML substreams 3 and 4. The compositing-instruction substream 0 may include instructions on a display location for the two HTML substreams 3 and 4. At time C, the user uses the input device to pull down a display menu and selects "display only the MPEG video stream 2" or "turn off OSD." Referring back to FIG. 2, the controller 202 then instructs the compositor 203 to stop compositing all other media streams into the final display signal. However, the video server 102 continues to transmit these data streams in the multiplexed data stream.

In order to save network bandwidth, the controller 202 may transmit, on a user control channel, an instruction signal to the video server 102 indicating which substreams the video server 102 should or should not transmit. The user control channel may be the same upstream control channels that are used to carry the viewer inputs to the video server 102.

In server-mediated alteration, the video server 102 performs the user initiated alteration. For example, instead of the controller 202 directing the compositor 203 to change the composition of the media substreams, the controller 202 transmits on the user control channel an instruction signal that includes the user's alterations to the video server 102. Then, the video server 102 makes the appropriate change to the composition of the media substreams. For example, the video server 102 may add additional media substreams indicated by the user. Also, the video server 102 may remove any type of media streams indicated by the user. Also, the video server 102 may change the display location, display shape, display size, display color, etc. of any of the media substreams.

Figure 7:
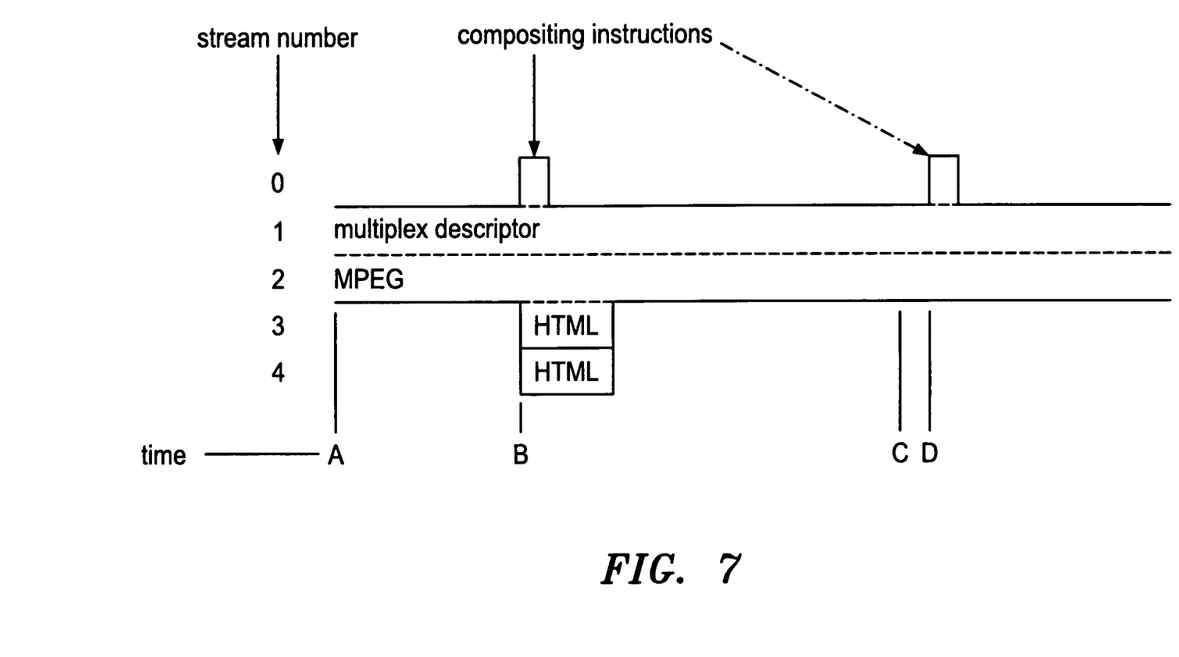
FIG. 7 illustrates an example of a server-mediated alteration of the data stream according to embodiments of the present invention.

FIG. 7 illustrates an example of a server-mediated alteration of the data stream according to embodiments of the present invention. In FIG. 7, at time C, the user uses the input device to pull down a server-provided menu and selects "do not display HTML substreams 3 and 4." In response, the video display device 103 transmits an instruction signal to the video server 102 via the user control channel. Referring to FIG. 3, the controller 301 generates a composite-instruction substream that includes a set of instructions not to display the text substreams 3 and 4 such as "stop compositing media substreams 3 and 4." The composite instructions arrive at the client at time D in FIG. 7. Additionally, the video server 102 may stop transmitting the media substreams 3 and 4. As a result, the video server 102 does not transmit this media substream in the multiplexed data stream.

Variations of the example embodiments of the present invention are not to be regarded as a departure from the spirit and scope of the example embodiments of the invention, and all such variations as would be apparent to one skilled in the art are intended to be included within the scope of this invention.

What is claimed:

1. A method for client-side compositing of media streams by a video display device, the method comprising:
   receiving, by the video display device, a multiplexed data stream from a remote video server, the multiplexed data stream being a signal that includes data representing substreams, the substreams including a descriptor substream, at least one media substream, and a compositing-instruction substream;
   demultiplexing, by the video display device, the multiplexed data stream into the substreams according to the descriptor substream; and
   displaying, by the video display device, the at least one media substream on a display screen according to the compositing-instruction substream, the compositing-instruction substream including instructions on a composition of the at least one media substream, wherein
   the displaying step displays the at least one media substream as one of an on-screen display and a picture-in-picture in an area of the display screen indicated by the compositing-instruction substream.

2. The method of claim 1, further comprising:
   receiving, by the video display device, a first instruction command from a user, the first instruction command changing a composition of the at least one media substream to a composition different from the composition indicated by the compositing-instruction substream, wherein the displaying step displays the at least one media substream according to the changed composition.

3. The method of claim 2, wherein the first instruction command indicates a removal of a media substream included in the multiplexed data stream.

4. The method of claim 2, wherein the first instruction command indicates a change of at least one of a display size, display color, display shape, or display location of the at least one media substream.

5. The method of claim 2, wherein the first instruction command indicates an addition of a media substream to the multiplexed data stream.

6. A method for client-side compositing of media streams by a video display device, the method comprising:
   receiving, by the video display device, a multiplexed data stream from a remote video server, the multiplexed data stream being a signal that includes data representing substreams, the substreams including a descriptor substream, at least one media substream, and a compositing-instruction substream;
   demultiplexing, by the video display device, the multiplexed data stream into the substreams according to the descriptor substream; and
   displaying, by the video display device, the at least one media substream on a display screen according to the compositing-instruction substream, the compositing-instruction substream including instructions on a composition of the at least one media substream, wherein
   the multiplexed data stream includes a plurality of media substreams, each of the plurality of media substreams includes same video data according to different display aspect ratios, the display step displays at least one of the plurality of media substreams that has a display aspect ratio that is closest to the video display device based on the compositing-instruction substream.

7. A method for client-side compositing of media streams by a video server, the method comprising:
generating, by the video server, a compositing-instruction substream, the compositing-instruction substream including one or more of instructions indicating an aspect ratio of at least one media substream and an area of a display screen to place an on screen display included in an on screen display substream, the video server being a server-side video server;
multiplexing, by the video server, a descriptor substream, the at least one media substream, and the compositing-instruction substream, the at least one media substream containing one or more of a plurality of media substreams which represent a same video according to different aspect ratios and both a video substream and the on screen display substream; and
transmitting, by the video server, the multiplexed data stream to be displayed on the display screen according to the compositing-instruction substream.

8. The method of claim 7, wherein the compositing-instruction substream indicating the area of the display screen to display the at least one media substream is an area to display one of the on-screen display and a picture-in-picture.

9. The method of claim 7, further comprising:
receiving, by the video server, a first instruction command from the video display device, the first instruction command changing a composition of the at least one media substream to a composition different from the composition indicated by the compositing-instruction substream, wherein the generating step generates an updated compositing-instruction substream indicating the changed composition.

10. The method of claim 9, wherein the first instruction command indicates a removal of a media substream included in the transmitted multiplexed data stream.

11. The method of claim 9, wherein the first instruction command indicates a change of at least one of a display size, display color, display shape, or display location of the at least one media substream included in the multiplexed data stream.

12. The method of claim 9, wherein the first instruction command indicates an addition of a media substream to the multiplexed data stream.

13. The method of claim 7, wherein the compositing-instruction substream includes instructions for a video display device to select one of the plurality of media substreams that has a display aspect ratio that is closest to the video display device.

14. A video display device for client-side compositing of media streams, the video display device comprising:
a demultiplexer configured to demultiplex a multiplexed data stream into substreams, the substreams including a descriptor sub-stream, at least one media substream, and a compositing-instruction substream, the compositing-instruction substream including instructions on a composition of the at least one media substream; and
a controller configured to display the at least one media substream on a display screen according to the compositing-instruction substream, wherein
the controller displays the at least one media substream as an on-screen display or a picture-in-picture in an area of the display screen indicated by the compositing-instruction substream.

15. The video display device of claim 14, wherein the video display device is configured to receive a first instruction command from a user, the first instruction command changing a composition of the at least one media substream to a composition different from the composition indicated by the compositing-instruction substream, wherein the controller displays the at least one media substream according to the changed composition.

16. The video display device of claim 15, wherein the first instruction command indicates a removal of a media substream included in the multiplexed data stream.

17. The video display device of claim 15, wherein the first instruction command indicates a change of at least one of a display size, display color, display shape, or display location of the at least one media substream.

18. The video display device of claim 15, wherein the first instruction command indicates an addition of a media substream to the multiplexed data stream.

19. A video display device for client-side compositing of media streams, the video display device comprising:
a demultiplexer configured to demultiplex a multiplexed data stream into substreams, the substreams including a descriptor sub-stream, at least one media substream, and a compositing-instruction substream, the compositing-instruction substream including instructions on a composition of the at least one media substream; and
a controller configured to display the at least one media substream on a display screen according to the compositing-instruction substream, wherein
the multiplexed data stream includes a plurality of media substreams, each of the plurality of media substreams includes same video data according to different display aspect ratios, and the controller displays at least one of the plurality of media substreams that has a display aspect ratio that is closest to the video display device based on the compositing-instruction substream.

20. A video server for client-side compositing of media streams, the video server comprising:
a controller configured to generate a compositing-instruction substream, the compositing-instruction substream including one or more of instructions indicating an aspect ratio of at least one media substream and an area of a display screen to place an on screen display substream, the video server being a server-side video server;
a multiplexer configured to multiplex a descriptor substream, the at least one media substream, and the compositing-instruction substream, the at least one media substream containing one or more of a plurality of media substreams which represent a same video according to different aspect ratios and both a video substream and the on screen display substream; and
the video server configured to transmit the multiplexed data stream to be displayed on a display screen according to the compositing-instruction substream.

21. The video server of claim 20, wherein the compositing-instruction substream indicating the area of the display screen to display the at least one media substream is an area to display one of the on-screen display and a picture-in-picture.

22. The video server of claim 20, wherein the video server is configured to receive a first instruction command from the video display device, the first instruction command changing a composition of the at least one media substream to a composition different from the composition indicated by the compositing-instruction substream, and the controller generates an updated compositing-instruction substream indicating the changed composition.

23. The video server of claim 22, wherein the first instruction command indicates a removal of a media substream included in the transmitted multiplexed data stream.

24. The video server of claim 22, wherein the first instruction command indicates a change of at least one of a display size, display color, display shape, and display location of the at least one media substream included in the multiplexed data stream.

25. The video server of claim 22, wherein the first instruction command indicates an addition of a media substream to the multiplexed data stream.

26. The video server of claim 20, wherein the compositing-instruction substream includes instructions for a video display device to select one of the plurality of media substreams that has a display aspect ratio that is closest to the video display device.

* * * * *